April 3, 1956
H. N. BRODSKY ET AL
2,740,872
FLUID-TIGHT ELECTRIC SWITCHES AND
METHODS OF MAKING THE SAME
Filed July 16, 1952
2 Sheets-Sheet 1
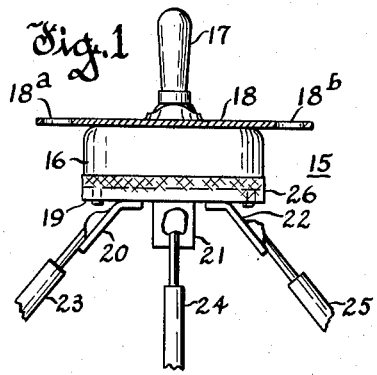
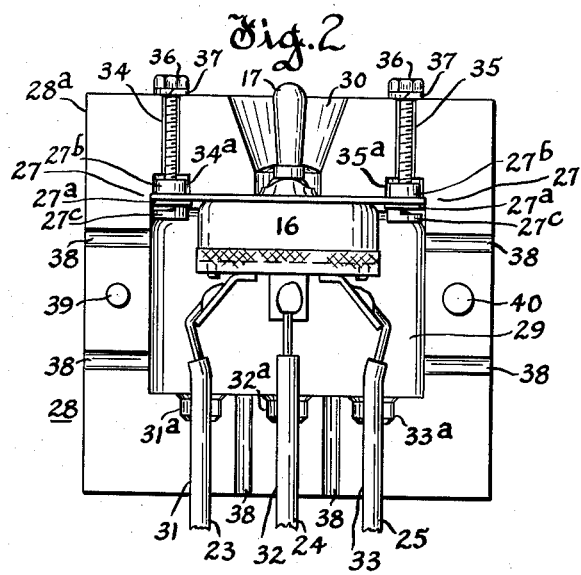
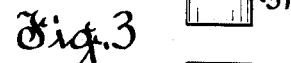
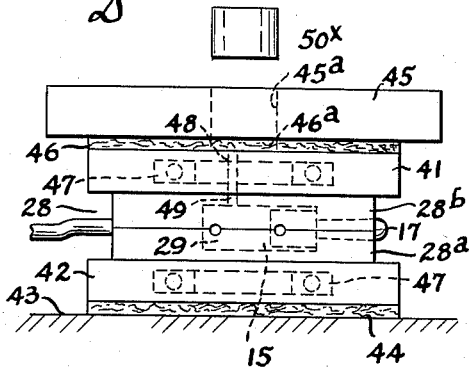
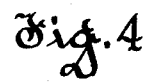
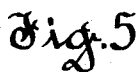
Inventors.
Harry N. Brodsky
Blair H. Chamberlin
By W. C. Lyon
Attorney

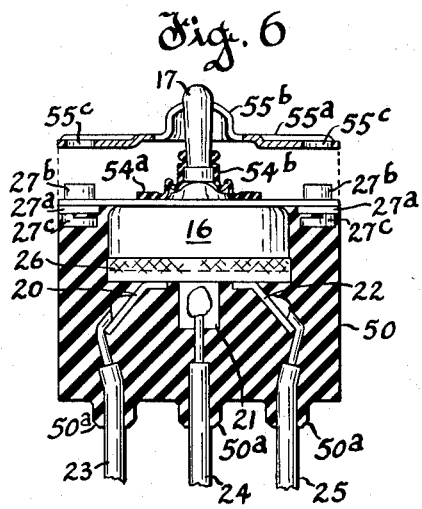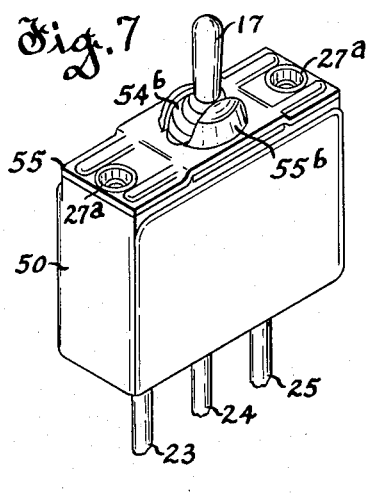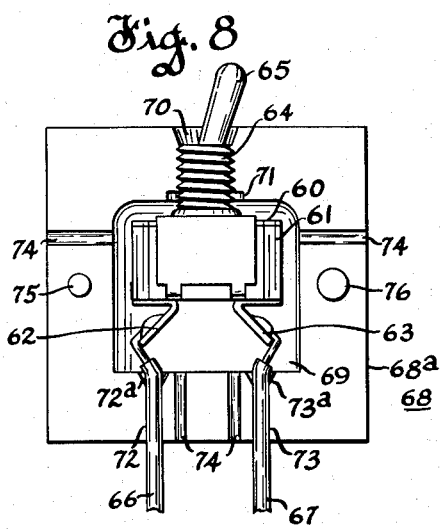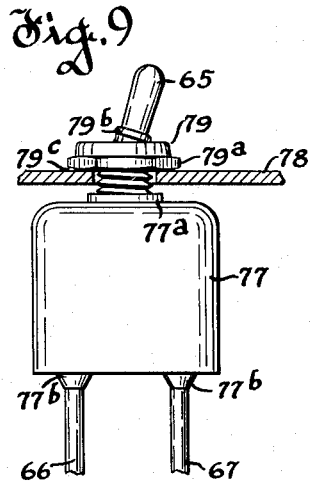

United States Patent Office 2,740,872
Patented Apr. 3, 1956

2,740,872

FLUID-TIGHT ELECTRIC SWITCHES AND METHODS OF MAKING THE SAME

Harry N. Brodsky and Blair H. Chamberlin, Detroit, Mich.; said Brodsky assignor to Riverside Mfg. & Electrical Supply Co., Inc., Dearborn, Mich., a corporation of Michigan; and said Chamberlin assignor to Cutler-Hammer, Inc., Milwaukee, Wis., a corporation of Delaware Application July 16, 1952, Serial No. 299,264

14 Claims. (Cl. 200—168)

This invention relates to fluid-tight electric switches and to methods for making the same.

Fluid-tight electric switches usually require use of hermetically sealed casings and auxiliary outside actuating mechanisms in their construction, and such construction has proved to be expensive and the added weight and bulk thereof is undesirable where space and weight are at a premium.

It is a primary object of the present invention to provide improved fluid-tight electric switch units which include in their construction commercially available switches, which are relatively inexpensive to manufacture, which are very compact, which obviate need for auxiliary actuating devices, and which are able to operate satisfactorily under widely varying moisture, temperature, and pressure conditions.

A more specific object is to provide fluid-tight electric switch units of the aforementioned character wherein the casing containing the commutating mechanism, portions of conductor leads and exterior wiring terminals to which the leads may be attached are embedded within a closely fitting, fluid impervious molded block of electrical insulating material, and wherein openings for the switch actuator are effectively sealed against entrance of fluids while permitting free operation of the actuator to its various operating positions, and Another object is to provide methods for making fluid-tight electric switch units of the aforementioned character which are readily carried out and necessitate a minimum of special equipment.

Other objects and advantages of the invention will hereinafter appear.

The accompanying drawings illustrate certain preferred fluid-tight switch units and various method steps used in making the same, which will now be described in detail, it being understood that the switch units illustrated and steps used in making the same can be modified in respect of details without departing from the scope of the appended claims.

In the drawings:

Figure 1 is a view in side elevation showing certain initial steps in the process of making a fluid-tight electric switch of the toggle lever, two-hole mounting type.

Fig. 2 shows the switch assembly of Fig. 1 mounted in one part of a molding die preparatory to a molding step.

Fig. 3 is a schematic view showing a molding die and die platen arrangement used in the step of molding a fluid-tight covering about a portion of the switch assembly.

Fig. 4 is a view in top plan of a partially completed switch assembly after removal from the molding die.

Fig. 5 is a view in top plan of a molded flexible rubber sealing device.

Fig. 6 is a view in vertical section showing the partially completed switch unit in a final stage of the process.

Fig. 7 is a perspective view of a completed fluid-tight switch unit of the toggle lever two-hole mounting type obtained by practice of the invention.

Fig. 8 is a view showing a switch of the toggle lever one-hole mounting type mounted in one part of a molding die preparatory to a molding step, and Fig. 9 shows a finished fluid-tight switch unit of the toggle lever one-hole mounting type obtained by practice of the invention.

Referring to Fig. 1, it shows a switch 15 having a metal casing 16 for the commutating mechanism (not shown), a toggle lever actuator 17, a top metal mounting plate 18 which is riveted to the casing by rivets (not shown), and a bottom insulating plate 19. Switch 15 is provided with external wiring terminals 20, 21 and 22 which extend below the lower surface of plate 19. As shown switch 15 in its external form is similar to a switch shown in the Krieger Patent 2,027,538 and it may be assumed that the switch has a commutating mechanism like that disclosed in the aforementioned patent.

As an initial step in the process, flexible rubber covered conductors 23, 24 and 25 are connected to terminals 20, 21 and 22, respectively, of switch 15 by soldering bared end portions of the wires thereof to such terminals. A high temperature solder having a melting point in excess of 350° F. should be used. The rubber insulating covers of the conductors are preferably formed from a synthetic type of rubber which is moisture impervious and able to withstand wide temperature variations. Conductors 23, 24, and 25 preferably should be cut so that the lengths thereof are at least two inches in extent.

Next, a strip of adhesive tape or gummed paper 26 is emplaced about the periphery of the switch casing to overlie and seal the joint between the bottom edge of casing 16 and the edge of the plate 19. The casing 16, the lower side of plate 18, the lower side of plate 19, terminals 20, 21 and 22, the bared wire portions of conductors 23, 24 and 25 and tape 26 are then completely coated with a rubber to metal type of adhesive. Then the insulating coverings of conductors 23, 24 and 25 for about two inches of their length back from their point of connection with the aforementioned terminals of switch 15 are coated with a suitable rubber to rubber adhesive. The aforementioned coatings are then allowed to air dry at room temperature for approximately one-half hour.

As shown in Fig. 2, internally threaded locknuts 27 having flange portions 27ᵃ, upper cylinder portions 27ᵇ and a transversely slotted lower cylinder portion 27ᶜ are inserted through the mounting holes 18ᵃ and 18ᵇ in top plate 18, with the flanges 27ᵃ thereof seating against the lower side of plate 18 and the cylindrical portions 27ᵇ extending above the upper surface of plate 18. The assembly is then placed in the bottom part 28ᵃ of a molding die 28 as shown in Fig. 2. Die part 28ᵃ is provided with a main die cavity portion 29 and a substantially frusto-conical opening portion 30 which opens to an outer wall of die part 28ᵃ and connects interiorly with the die cavity portion 29. Opening portion 30 is adapted to accommodate toggle lever 17 regardless of its operating position. Semi-circular opening portions 31, 32, and 33 which open to an opposite outer wall of die part 28ᵃ and communicate with recess portions 31ᵃ, 32ᵃ and 33ᵃ, respectively, which connect interiorly with cavity portion 29, are adapted to accommodate portions of the conductors 23, 24 and 25. Semi-circular opening portions 34 and 35 open to the first mentioned outer wall of the die part 28ᵃ and communicate with semi-circular recesses 34ᵃ and 35ᵃ, respectively, which connect interiorly with cavity portion 29. Recess portions 34ᵃ and 35ᵃ accommodate the upper cylindrical portions 27ᵇ of the nuts 27. Temporary securing screws 36 take into the nuts 27 and together with washers 37 underlying the heads of the screws are used to secure the switch 15 in place in the die part 28ᵃ with the top plate 18 abutting against an inner side wall of the die cavity portion 29. A plurality of semi-circular relief opening portions 38 open to the various outer walls of the die part 28ª and connect interiorly with the die cavity portion 29 in the die part 28ª. Die part 28ª is provided with locating pins 39 and 40 of different sizes which are adapted to fit within complementally formed receiving openings (not shown) in an upper mating die part 28ᵇ (see Fig. 3). As will be understood the upper die part 28ᵇ will be internally formed exactly like die part 28ª with a main die cavity portion, various semi-circular opening portions and recess portions like that aforementioned in connection with die part 28ª and adapted to mate therewith.

As shown in Fig. 3, closed die 28, with switch 15 and portions of conductors 23, 24 and 25 mounted therein, is placed between upper and lower die platens 41 and 42. Platen 42 is secured to a rigid base 43 and is insulated therefrom by a heat insulating pad 44. The upper platen 41 is secured to a movable base member 45 from which it is insulated by a heat insulating pad 46, like pad 44. Platens 41 and 42 are provided with internally mounted electric sheathed heating elements 47 which are preferably of annular form. Although not shown it may be assumed that heating elements 47 are connected for electric supply and are so controlled as to maintain the temperature of the respective platens at approximately 350° F. Platen 41 is provided with three parallel vertically disposed openings 48 which extend therethrough in concentric alinement with corresponding gate openings 49 which extend to the upper outer surface of die part 28ᵇ and connect interiorly with the main die cavity. A relatively large cylindrical opening 45ª extends through base member 45 and alines with a similar opening 46ª extending through insulating pad 46 and surrounding the aforementioned openings 48 in platen 41.

A cylindrical preform 50ˣ of uncured rubber, which has preferably been preheated to a temperature of approximately 150° F., to render it semi-plastic, is then inserted through openings 45ª and 46ª so that it bottoms on the upper surface of platen 41 in overlying relation to the openings 48. A cylindrical piston 51, which has an outer diameter slightly less than the internal diameter of openings 45ª and 46ª, is moved downwardly into engagement with preform 50ˣ and pressure is applied on the latter by the piston. The heat generated in the die platens and pressure applied on the preform causes the latter to become sufficiently plastic so that it flows or extrudes through openings 48 and 49 into the main die cavity to fill the same, and an excess thereof extrudes out through relief openings 38 indicating filling of the die cavity. During such extrusion the pressure applied by piston 51 drops off, but a certain degree of pressure should be continued to be maintained by the piston following filling of the main die cavity during curing or vulcanizing of the rubber in the die.

The size of preform 50ˣ should be so selected that its volume is in excess of the volume of the main die cavity in die 28. This insures that the main die cavity will be completely filled and the aforementioned components therein will be completely surrounded and embedded in rubber.

As will be understood by those skilled in the art, the pressure that should be, or is required to be applied, on preform 50ˣ to render it plastic, cause it to extrude into and fill the main die cavity and an excess amount of plastic rubber to extrude out the relief openings depends upon a number of variables, most important of which appear to be as follows:

(a) The composition of the rubber in the preform and kinds and amounts of "plasticizers" and "accelerators" present therein.

(b) The temperature of the die.

(c) The die cavity volume and formation, and the number and placement of relief openings.

(d) The crushing strength of the switch casing.

It is desirable that the temperature of the die platen and die, and the pressure applied upon the uncured rubber preform be such that the latter becomes plastic and extrudes into and fills the main die cavity rather quickly. If the pressure initially built up on the preform is not sufficiently great it may plasticize in stages and extrusion thereof into the main die cavity occur so slowly that some of the rubber in the die cavity cures before the cavity is completely filled which is undesirable. On the other hand, if the pressure initially built up on the preform is too great, the pressure in the die cavity may become so great as to cause crushing of the casing of the switch and possible damage to the die. We have found, as a general rule, that the temperature of the die should not be maintained appreciably in excess of 350° F. Maintenance of higher die temperatures may have a deleterious effect on the structure and alinement of parts in the switch casing.

As aforeindicated, the rubber in the die cavity is cured or vulcanized therein while a certain amount of pressure is maintained by piston 51. The cure time required of course is dependent upon the kind and amount of "accelerators" present in the uncured rubber composition and the die temperature. With a die temperature of approximately 350° F., the cure time ranges in the neighborhood of five or six minutes. Maintenance of pressure by piston 51 insures against extrusion of rubber back out through openings 48 and 49.

Following curing of the rubber in the die cavity the die is opened and the switch assembly withdrawn from the die. Excess uncured rubber which extrudes through the relief openings in the die is then cut off from the main vulcanized rubber molding. As shown in Figs. 4 and 6, at this stage in the process the casing 16, flanges 27ª and the lower cylindrical portions 27ᶜ of nuts 27, terminals 20, 21 and 22, and portions of conductors 23, 24 and 25 adjacent to the terminals are embedded in intimate bonded relation in a substantially rectangular vulcanized block of rubber 50. As shown in Fig. 6, block 50 has downwardly extending boss portions 50ª which surround and are intimately bonded with the rubber insulating coverings of conductors 23, 24 and 25. Such boss portions 50ª afford additional strain relief for conductors 23, 24 and 25 and thus minimize the chance of cracks or fissures developing in block 50 as an incident to twisting or pulling on the conductors.

As shown at 52 and 53, Fig. 4, the heads of the rivets securing top plate 18 to casing 16 are then soldered over, or a neoprene to metal cement applied thereover, to insure complete sealing of the rivet receiving openings in the plate casing. Next, as shown in Figs. 5 and 6, an elastic rubber sealing device 54 having a rectangular flat base portion 54ª and an upstanding centrally apertured accordion pleated portion 54ᵇ is slipped over toggle lever 17, the base portion 54ª thereof seated against the upper surface of top plate 18 and portion 54ᵇ thereof disposed about and tightly gripping the shank of toggle lever 17. Preferably a suitable rubber to metal cement is applied to the lower surface of portion 54ª so that a good seal is effected between it and the upper surface of plate 18.

Sealing device 54 is preferably molded from a synthetic rubber, such as FR neoprene of FF specification. A neoprene rubber composition of the aforementioned type is water and oil resistant and retains its flexibility at −70° F. The central aperture in the portion 54ᵇ should be substantially smaller in diameter than the shank of toggle 17 so that the latter will be tightly gripped in sealing relation, thereby insuring against entrance of water or other fluids therebetween. As will be understood, the accordion pleats of portion 54ᵇ permit free movement of the toggle lever 17 between its various operating positions.

As shown in Fig. 6, a guard plate 55, having a substantially rectangular base portion 55ª, a longitudinally slotted centrally located bell portion 55b, and receiving openings 55c extending through portion 55a adjacent each end thereof, is then placed over toggle lever 17 and the upwardly extending cylindrical portions 27b of nuts 27 and portion 55a thereof seated on its lower surface against the upper surfaces of plate 18 and portion 54a of sealing device 54. Portions 27b of nuts 27 are then upset over the upper surface of portion 55a to rigidly secure plate 55 to the switch unit. Plate 55 when so secured, serves to hold the portion 54a of sealing device 54 in compressed sealed relation with the upper surface of plate 18, and the slotted bell portion 55b permits unrestricted movement of toggle lever 17 between its operating positions while affording protection to the portion 54b of sealing device 54.

Fig. 7 shows a completed fluid-tight switch unit obtained by practice of the process hereinbefore described. Such switch unit will be completely impervious to water and other fluids, and will be able to be operated satisfactorily in an ambient temperature range of 160° to −65° F. Fluid-tight switch units of this type have been subjected to hydrostatic tests, equivalent to external water pressure of 10 lbs. per square inch, for considerable periods of time without evidence of water having entered into the interior of the switch casing or effecting the electrical operating characteristics of the switch unit.

Fig. 8 depicts a similar stage in the process of making a toggle lever switch of the one-hole mounting type 60 fluid-tight, as that shown in Fig. 2. Switch 60 is provided with the casing 61 housing the commutating mechanism, wiring terminals 62 and 63 extending below the lower surface of casing 61, an externally threaded nipple 64 and a toggle lever 65 extending outwardly through the nipple 64. After attachment to wiring terminals 62 and 63 of flexible rubber covered conductors 66 and 67, respectively, and after initial preparation of the switch casing 61 in the manner aforeindicated in connection with Fig. 1, switch 60 and its attached conductors 66 and 67 are then placed in a lower die part 68a of a suitable molding die 68. Die part 68a is provided with a main cavity portion 69, an internally threaded semi-circular opening portion 70 opening to an outside wall of the die and connecting with a semi-circular recess portion 71 which connects with cavity portion 69. Semi-circular opening portions 72 and 73 which open an outer wall of the die part and connect with frusto-conical recesses 72a and 73a, respectively, connecting interiorly with cavity portion 69, are adapted to accommodate portions of the conductors 66 and 67. A plurality of relief openings 74 which extend from the various outer walls of the die part and connect interiorly with the cavity portion 69 are provided. Switch 60 is placed in a die part 68a with the threads of its nipple 64 engaging with the threads in the opening portion 70 and its casing 61 disposed in the cavity portion 69. As will be understood, die 68 additionally comprises an upper die part (not shown) having a main die cavity portion, various opening portions and recess portions exactly like and adapted to mate with those aforementioned in connection with die part 68a. Such upper die portion would also be provided with openings extending downwardly from the mating surface thereof to accommodate locating pins 75 and 76 carried in die part 68a.

Following emplacement of switch 60 and portions of its conductors 66 and 67 in position in die part 68a and closing of the aforementioned upper die part thereon, the closed die would then be placed in position between a die platen arrangement, like that shown in Fig. 3, and molding of rubber about switch 60 and the portions of conductors 66 and 67 within the die cavity would then be carried out as aforedescribed in connection with switch 15. Following the molding and curing steps, switch 60 and portions of the conductors 66 and 67 adjacent to the terminals 62 and 63 will be embedded in a substantially rectangular block of vulcanized rubber 77 as shown in Fig. 9. Block 77 has an upstanding cylindrical boss 77a which extends above the upper surface of the block and surrounds a portion of the nipple 64, and frusto-conical bosses 77b extending below the lower surface of the block and surrounding portions of the conductors 66 and 67 to afford added strain relief for such conductors adjacent block 77.

As shown in Fig. 9, the fluid-tight switch unit of the one-hole mounting type is adapted to be mounted and secured to a panel 78 by means of a seal nut 79. Seal nut 79, which in one preferred form is like that disclosed in the Johanson et al. Patent 2,462,023, comprises an internally threaded nut 79a, a centrally apertured flexible rubber accordion pleated diaphragm 79b, which is anchored to nut 79a and overlies one end and the opening therein, and a flexible rubber annular gasket 79c seating within an annular groove formed in the opposite face of nut 79a. Diaphragm 79b, which is similar in form to diaphragm portion 54b of sealing device 54 shown in Figs. 5 and 6, is adapted to overlie the opening in nipple 64 and tightly grip the shank of actuator 65 to seal such opening against the entrance of water and other fluids while permitting free movement of actuator 65 to its various operating positions. Taking down of nut 79a on nipple 64 causes the upper end of boss 77a to be drawn up in compressive sealing engagement with the lower surface of panel 78, and gasket 79c to be drawn down in compressive sealing engagement with the upper surface of panel 78.

The free length of nipple 64 extending above boss 77a can be readily varied to suit various panel thicknesses as desired, within limits, by suitable positioning of switch 60 in molding die 68. As will be apparent, if it is desired to increase such free length of nipple 64 then nipple 64 should be seated farther up in the threaded opening 70 in die 68, and conversely by seating nipple 64 lower in opening 70 its free length extending above the boss 77a of block 77 will be shortened.

In certain applications it may be desirable to have bare wire leads or bare rigid terminal extensions extend out through the vulcanized rubber block, rather than the flexible rubber covered conductors hereinbefore described with the switch units of Figs. 7 and 9. The only change required in the process when bare wire leads or bare rigid terminal extensions are used is that the portions thereof which will lie within the vulcanized rubber block should be coated with a rubber to metal adhesive preparatory to the molding step to insure good bonding with the embedding rubber block.

While in effecting molding of an insulated block of material about the switch casings, terminals, and portions of insulated conductors connected to the terminals of the forms of switches herein disclosed we have described one preferred rubber molding material and an extrusion method of molding the same, our invention is not to be considered as limited to such material or method of molding the same. It will be apparent to those skilled in the art that synthetic rubbers and thermal setting plastics might be used as molding materials, and that compression molding may be used where the particular molding material makes the use of the latter molding method more suitable.

It will also be understood that the method and means for providing fluid-tight switches hereinbefore described is not necessarily limited to application with switches having toggle lever actuators. The method and basic structure can be readily adapted to switches having pushbutton and other types of actuators by suitable selection of flexible sealing devices for such actuators.

We claim:

1. A fluid-tight electric switch unit comprising in combination, a switch including a case for the commutating mechanism and an actuator extending through an opening in said case, conductors having electrical connection with said switch, a molded mass of moisture impervious insulating material in which said case and portions of said conductors adjacent said case are embedded in bonded and sealed relation, and sealing means for said opening in said case constructed to permit free operation of said actuator.

2. A fluid-tight electric switch unit comprising in combination, a switch including a case for the commutating mechanism and an actuator extending through an opening in said case, conductors having electrical connection wtih said switch, a molded mass of moisture impervious insulating material in which said case and portions of said conductors adjacent said case are embedded in bonded and sealed relation, and sealing means for said opening in said case including a flexible fluid impervious diaphragm overlying said opening in said case and constructed to permit free operation of said actuator.

3. A fluid-tight electric switch unit comprising in combination, a switch including a case for the commutating mechanism and an actuator extending through an opening in said case, external conductor leads having electrical connection with said switch, a molded mass of moisture impervious insulating material in which said case, said terminals and portions of said leads adjacent said case are embedded in bonded and sealed relation, and sealing means for said opening in said case including a flexible fluid impervious diaphragm overlying said opening in said case and constructed to permit free operation of said actuator.

4. A fluid-tight electric switch unit comprising in combination, a switch including a case for the commutating mechanism, an actuator extending through an opening in said case and exterior wiring terminals, conductors connected to said terminals, a molded mass of moisture impervious insulating material in which said case, said terminals and portions of said conductors adjacent said terminals are embedded in bonded and sealed relation, and sealing means for said opening in said case including a flexible fluid impervious diaphragm overlying said opening in said case and constructed to permit free operation of said actuator.

5. A fluid-tight electric switch unit comprising in combination, a switch including a case for the commutating mechanism, a mounting plate secured to and overlying said case, a toggle lever actuator projecting through openings in said case and said plate and extending beyond the latter and exterior wiring terminals, conductors connected to said terminals and having moisture impervious insulating coverings, a molded mass of moisture impervious electrical insulating material in which said case, the surface of said plate adjacent said case, said terminals and portions of said conductors adjacent said terminals are embedded in bonded and sealed relation, and sealing means for said openings including an elastic rubber member having an accordion pleated portion disposed about and tightly gripping the shank of said actuator in overlying relation to said openings and an integral base portion in sealed engagement with the other surface of said plate.

6. A fluid-tight electric switch unit comprising in combination, a switch including a case for the commutating mechanism, a mounting plate secured to and overlying said case, a toggle lever actuator projecting through openings in said case and said plate and extending beyond the latter and exterior wiring terminals, conductors connected to said terminals and having moisture impervious insulating coverings, a vulcanized block of molded rubber in which said case, the surfaces of said plate adjacent said case, said terminals and portions of said conductors adjacent said terminals are embedded in bonded and sealed relation, and sealing means for said openings including an elastic rubber member having a central accordion pleated portion disposed about and tightly gripping the shank of said actuator in overlying relation to said openings and an integral base portion in sealed engagement with the other surface of said plate.

7. A fluid-tight electric switch unit of the two-hole mounting type comprising in combination, a switch including a case for the commutating mechanism, a mounting plate secured to and overlying said case, said plate having openings adjacent each end thereof, lock-nuts disposed through said plate openings and having portions extending beyond both surfaces of the latter, a toggle lever actuator projecting through registered openings in said case and said plate and extending beyond the latter, exterior wiring terminals, conductors connected to said terminals and having flexible rubber coverings, a vulcanized block of molded rubber in which said case, the surface of said plate adjacent said case, portions of the lock-nuts projecting beyond the last mentioned surface of said plate, said terminals and portions of said conductors adjacent said terminals are embedded in bonded and sealed relation, said block having integrally formed bushings through which said conductors project, an elastic rubber member having a central accordion pleated portion disposed about and tightly gripping the shank of said actuator and an integral base portion in sealed engagement with the other surface of said plate, and a second plate overlying said base portion of said member and said other surface of the first mentioned plate to which it is secured by upsetting of said lock-nuts thereover, said second plate having a central longitudinally slotted bell disposed about said shank of said actuator and said pleated portion of said member.

8. A fluid-tight electric switch unit of the one-hole mounting type comprising in combination, a switch including a case for the commutating mechanism, an externally threaded nipple extending from said casing, an actuator projecting through and beyond the outer end of said nipple and external wiring terminals, conductors connected to said terminals and having moisture impervious insulating coverings, a molded block of insulating material in which said case, a portion of said nipple adjacent said case, said terminals, and portions of said conductors adjacent said terminal are embedded in bonded and sealed relation, and a sealing device including a nut having threaded engagement with said nipple and a flexible fluid impervious diaphragm secured to said nut in overlying relation to the nipple opening and tightly gripping said actuator in sealed relation.

9. A fluid-tight electric switch unit of the one-hole mounting type comprising in combination, a switch including a case for the commutating mechanism, an externally threaded nipple extending from said casing, an actuator projecting through and beyond the outer end of said nipple and external wiring terminals, conductors connected to said terminals and having rubber insulating coverings, a vulcanized block of molded rubber in which said case, a portion of said nipple adjacent said case, said terminals and portions of said conductors adjacent said terminals are embedded in bonded and sealed relation, and a sealing device including a nut having threaded engagement with said nipple and an elastic rubber accordion pleated diaphragm secured to said nut in overlying relation to said nipple opening and tightly gripping the shank of said actuator in sealed relation.

10. A fluid tight electric switch unit of the one-hole mounting type comprising in combination, a switch including a case for the commutating mechanism, an externally threaded nipple extending from said casing, an actuator projecting through and beyond the outer end of said nipple, and external wiring terminals, conductors connected to said terminals and having rubber insulating coverings, a vulcanized block of molded rubber in which said case, a portion of said nipple, said terminals and portions of said conductors adjacent said terminals are embedded in bonded and sealed relation, said block of rubber having integrally formed bushings through which said nipple and said conductors extend, and a sealing device including a nut having threaded engagement with said nipple, an elastic rubber accordion pleated diaphragm secured to said nut in overlying relation to said nipple opening and tightly gripping the shank of said actuator in sealed relation and gasket means associated with said nut affording in cooperation with the nipple bushing sealing of the nipple receiving opening in a wall to which the switch is mounted.

11. The method of providing a fluid-tight electric switch unit having a case for the commutating mechanism, an actuator extending outwardly of said case through an opening therein and exterior wiring terminals on said case, which comprises the steps of, attaching to said terminals conductors, heat and pressure molding a water impervious mass of electrical insulating material about said case, said terminals and portions of said conductors adjacent said terminals to embed the same therein in bonded and sealed relation, and sealing said opening in said case by means including a flexible fluid impervious diaphragm disposed to overlie said opening and permit free operation of said actuator.

12. The method of providing a fluid-tight electric switch unit having a case for the commutating mechanism, an actuator extending outwardly of said case through an opening therein and exterior wiring terminals on said case, which comprises the steps of, attaching to said terminals conductors having water impervious insulating coverings, placing said case, said terminals and portions of said conductors adjacent said terminals in a molding die, extruding plastic uncured rubber into said die around and about the aforementioned parts in said die, curing said rubber in said die to provide a vulcanized rubber block in which said aforementioned parts are embedded in bonded and sealed relation, and sealing said opening in said case against entrance of water by means including a flexible fluid impervious diaphragm disposed to overlie said opening and permit free operation of said actuator.

13. The method of providing a fluid-tight electric switch unit having a case for the commutating mechanism, a mounting plate secured to and overlying said case, a toggle lever actuator projecting through registered openings in said case and plate and extending beyond the latter and exterior wiring terminals on said case, which comprises the steps of, attaching to said terminals conductors having water impervious insulating covering, placing said case, said plate, said terminals and portions of said conductors adjacent said terminals in a molding die, extruding plastic uncured rubber into said die around and about said case, the surface of said plate adjacent said case, said terminals and portions of said conductors adjacent said terminals, curing said rubber in said die to provide a vulcanized rubber block in which the aforementioned parts are embedded in bonded and sealed relation, and sealing to the other surface of said plate a member having a flexible fluid impervious diaphragm portion to be disposed about and tightly grip the shank of said actuator in overlying relation to said registered openings, to prevent entrance of fluids through the latter and permit free operation of said actuator.

14. The method of providing a fluid-tight electric switch unit having a case for the commutating mechanism, an externally threaded mounting nipple extending beyond said case, a toggle lever actuator projecting through said nipple and beyond the open end of the latter, and exterior wiring terminals on said case, which comprises the steps of, attaching to said terminals conductors having water impervious insulating coverings, placing said case, a portion of said nipple adjacent said case, said terminals and portions of said conductors adjacent said terminals in a molding die, extruding plastic uncured rubber into said die around and about the aforementioned parts therein, curing said rubber in said die to provide a vulcanized block of rubber in which said aforementioned parts are embedded in bonded and sealed relation, and securing a nut to said nipple having an elastic rubber diaphragm adapted to tightly grip the shank of said actuator in overlying relation to the opening in said nipple.

References Cited in the file of this patent

UNITED STATES PATENTS

| Number | Name | Date |
|---|---|---|
| 1,333,004 | Vaughn | Mar. 9, 1920 |
| 2,287,650 | Tornblom | June 23, 1942 |
| 2,334,901 | Bullerjahn | Nov. 23, 1943 |
| 2,345,757 | Lester | Apr. 4, 1944 |
| 2,367,441 | Schwinn | Jan. 16, 1945 |
| 2,428,275 | Frankwich et al. | Sept. 30, 1947 |
| 2,440,943 | Gonsett | May 4, 1948 |
| 2,462,023 | Johansen et al. | Feb. 15, 1949 |
| 2,511,436 | Kauth | June 13, 1950 |
| 2,549,323 | McMullen et al. | Apr. 17, 1951 |